(12) United States Patent
Hendriks et al.

(10) Patent No.: US 8,276,928 B2
(45) Date of Patent: Oct. 2, 2012

(54) CONSOLE FOR ATTACHMENT TO A VEHICLE CHASSIS AND VEHICLE COMPRISING A SUSPENSION CARRYING CONSOLE

(75) Inventors: Jan Hendriks, Göteborg (SE); Roland Svensson, Väröbacka (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 13/496,235

(22) PCT Filed: Sep. 18, 2009

(86) PCT No.: PCT/SE2009/000416
§ 371 (c)(1),
(2), (4) Date: Mar. 15, 2012

(87) PCT Pub. No.: WO2011/034470
PCT Pub. Date: Mar. 24, 2011

(65) Prior Publication Data
US 2012/0175858 A1    Jul. 12, 2012

(51) Int. Cl.
*B60G 3/12* (2006.01)
(52) U.S. Cl. ... 280/124.128; 280/124.161; 280/124.164; 280/124.165; 280/124.175
(58) Field of Classification Search ........... 280/124.109, 280/124.128, 124.161, 124.164, 124.165, 280/124.175
See application file for complete search history.

(56) References Cited

U.S. PATENT DOCUMENTS

| | | | | |
|---|---|---|---|---|
| 2,742,301 A * | 4/1956 | Pointer | ............... | 280/683 |
| 2,902,291 A * | 9/1959 | Walker | ............... | 280/6.159 |
| 3,008,729 A * | 11/1961 | Muller et al. | ............... | 280/5.509 |
| 3,063,732 A * | 11/1962 | Harbers et al. | ............... | 280/6.16 |
| 3,880,445 A * | 4/1975 | Chieger | ............... | 280/783 |
| 3,906,869 A * | 9/1975 | Dobson et al. | ............... | 105/164 |
| 3,992,035 A * | 11/1976 | Dezelan et al. | ............... | 280/683 |
| 4,143,925 A * | 3/1979 | Young | ............... | 303/22.5 |
| 4,311,098 A * | 1/1982 | Irwin | ............... | 105/226 |
| 4,717,170 A * | 1/1988 | Mounier-Poulat et al. | ... | 280/683 |
| 4,753,174 A | 6/1988 | Berg et al. | | |
| 4,930,807 A * | 6/1990 | Lachaize | ............... | 280/5.505 |
| 6,662,853 B2 * | 12/2003 | Bauer et al. | ............... | 164/137 |
| 6,746,031 B2 | 6/2004 | Carlstedt | | |
| 7,243,949 B2 * | 7/2007 | Valdez et al. | ............... | 280/782 |
| 2005/0062251 A1 | 3/2005 | Ramsey | | |

FOREIGN PATENT DOCUMENTS

| | | |
|---|---|---|
| DE | 102006009188 A1 | 9/2007 |
| DE | 102006010185 A1 | 9/2007 |
| EP | 1564036 A2 | 8/2005 |
| WO | 2006067551 A1 | 6/2006 |

OTHER PUBLICATIONS

International Search Report for correspondinig International App. PCT/SE2009/000416.

* cited by examiner

*Primary Examiner* — Toan To
(74) *Attorney, Agent, or Firm* — WRB-IP LLP

(57) ABSTRACT

A console is provided for attachment to a vehicle chassis. The console includes a bracket body for a truck. The bracket body is formed by a casting which at least partly encloses a cavity for storing a fluid.

9 Claims, 5 Drawing Sheets

CONSOLE FOR ATTACHMENT TO A VEHICLE CHASSIS AND VEHICLE COMPRISING A SUSPENSION CARRYING CONSOLE

BACKGROUND AND SUMMARY

The present invention relates to a console for attachment to a vehicle chassis and a vehicle comprising a console.

U.S. Pat. No. 6,746,031 discloses air tanks arranged in axles, cross members, stabilizer bars or control arms of a truck for storing pressurized air used for air suspension and/or for air brakes. In order to form a cavity for storing the pressurized air, partition walls can be welded to the structure.

U.S. 2005 0062251 A1 teaches an air tank as structural element being arranged between the two parallel main beams of a vehicle's frame. The air tank replaces a conventional cross beam. The air tank is integral part of the frame construction.

DE 10 2006 010 185 A1 reveals an air tank assembly fixed to a frame of a vehicle such that additional constructional elements like car wing or splashboard can be attached to the air tank assembly. The air tank is located inside the frame assembly at the frame's main construction level.

It is desirable to improve the fabrication of additional fluid storage room. It is also desirable to provide a vehicle with such a fluid storage room.

According to an aspect of the present invention, a console for attachment to a truck chassis is proposed, wherein the console comprises a bracket body which bracket body is formed by a casting which at least partly encloses a cavity for storing a fluid.

The console is particularly a suspension carrying console. Expediently, a casing of the bracket body surrounds the cavity forming a fluid tank. The fluid can be a gas or a liquid, and the fluid can be pressurized or under ambient pressure.

Particularly, the fluid can be pressurized air. Favourably, the cavity enclosed by the console as well as the casing surrounding the cavity is easily accessible and service friendly. Despite the very restricted space in a truck frame, additional space is made available by using the bracket body as storage space. The console can easily provide a storage volume of several liters without colliding with other components between the vehicle frame rails. Particularly when used for pressurized air, for instance in the vehicle suspension, long piping can be avoided as the console is automatically located close to the wheel suspension where the pressurized air may be needed.

According to a favourable embodiment of the invention, the bracket body can at least partially be integrated in a casing surrounding the cavity. Advantageously, a portion of the bracket body itself can form a container or, alternatively, the bracket body can be a support for a container constituting the casing. Expediently, the bracket body can be cast enclosing a cavity. The manufacturing of the bracket body is simple. The attachment points for components such as reaction stays or fastening rods and the like can remain unaltered. Only a middle region of the console is used for forming or supporting a cavity for storing a fluid.

Advantageously, the casing can have an oval or ellipsoid shape. Other shapes can be employed, of course. The shape of the casing can be adapted to the kind or state of fluid stored in the container. Expediently, the shape of the casing can be easily designed for the requirements of a pressurized fluid, for instance pressurized air.

According to a favourable embodiment of the invention, the console can be embodied as a reaction-stay console to which reaction stays are attachable. The console can carry forces of the wheel holder over the reaction stays or suspension elements and introduce these forces into the chassis. The console can also be called a reaction stay console. Production of the console can be technical simplified when the console acts as carrier and takes the function of a tank at the same time. The integration into a bracket body can reduce the number of construction parts. Favourably, it is possible to produce the console and the hollow casing in the bracket body in one production step, particularly by casting the console and the casing enclosing the cavity in one casting mould. The casing can be defined by a sand core which can be removed after casting the console. Thus, various three-dimensional forms and volumes can be manufactured.

According to a favourable embodiment of the invention, the bracket body of the console can provide an opening for mounting the casing to the bracket body. In this case, the bracket body forms a frame around the casing. An advantage is that the casing, for instance forming a pressurized air tank, is easily accessible for servicing purposes or for an exchange of the casing. Fixing the casing to the console can be achieved by well known techniques, as for example by welding, riveting, screwing or the like.

According to a favourable embodiment of the invention, the tank can be inserted and fixed in a corresponding opening of the console.

According to a favourable embodiment, the casing of the tank can protrude from one side of the bracket body only. The opposite side of the bracket body can be used, for other installations.

According to a favourable embodiment, the casing of the tank can protrude from both sides of the bracket body. In this case, the volume of the cavity which is partially enclosed by the bracket body is doubled compared to a one-sided arrangement.

According to a favourable embodiment, the casing can provide a minimum volume of 5 liters, preferably a volume of at least 10 liters, preferably of up to 15 liters. Expediently, additional storage volume can be provided for a fluid, e.g. for pressurized air or another fluid such as oil or the like.

Favourably, by integration of the casing or tank into the bracket body, the number of parts in the vehicle can be reduced thus providing a weight and space efficient packaging of components. It is possible to integrate stabilizing or stiffening structures in the casing enclosing the cavity.

According to a favourable embodiment, one or more attachment ducts can be provided at the console as inlet and/or outlet for the fluid in the cavity. Expediently, the attachment ducts can be connected to openings which are used for removing a sand core used during casting. The attachment ducts can connect the fluid, e.g. pressurized air, to consumers in the vehicle, e.g. an air suspension.

BRIEF DESCRIPTION OF THE DRAWINGS

The present invention together with the above-mentioned and other objects and advantages may best be understood from the following detailed description of the embodiments, but not restricted to the embodiments, wherein is shown schematically.

DETAILED DESCRIPTION

Figure 1:
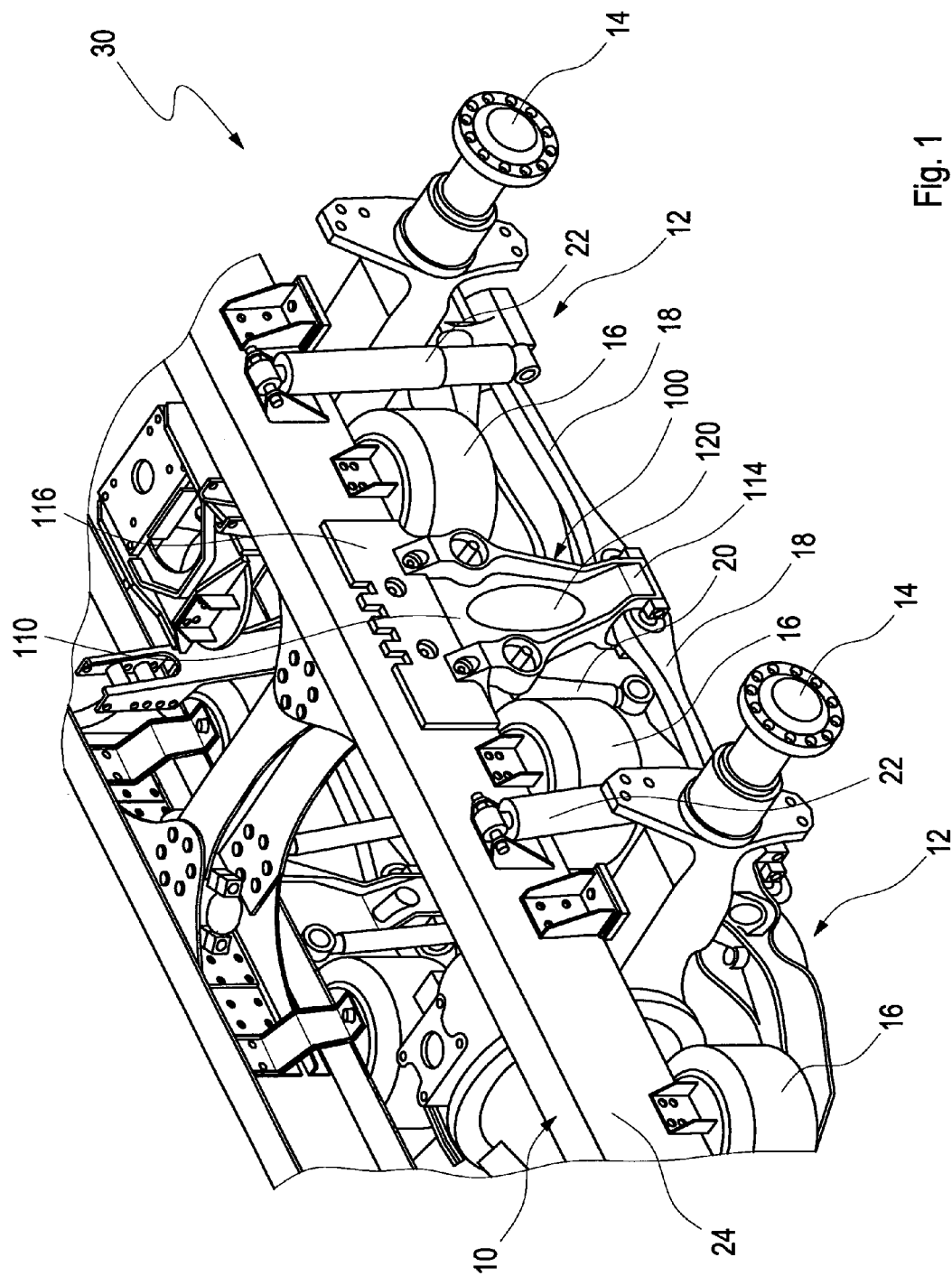
FIG. 1 a perspective partial view of a truck-chassis with a console attached to a truck chassis.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts for example a frame 10 of a vehicle such as a truck with an air suspension 12 comprising air bellows 16 and dampers 22 for damping vertical movements of wheel holders 14 attached to wheel axles. A console 100 is arranged between the two wheel holders 14 and attached with an upper part 116 to the frame 10 for introducing forces from the wheels (not shown) on the wheel holders 14 into the frame 10. The console 100 is a suspension carrying console.

The wheel holders 14 are connected to the console 100 via reaction stays 18 at a lower bifurcated receptacle 114 of the console 100. One of the air bellows 16 is attached to the console 100 via a fastening rod 20. The console 100 comprises a casing 120 in its bracket body 110. The casing 120 can be used as a tank for storing a fluid such as pressurized air.

Figure 2:
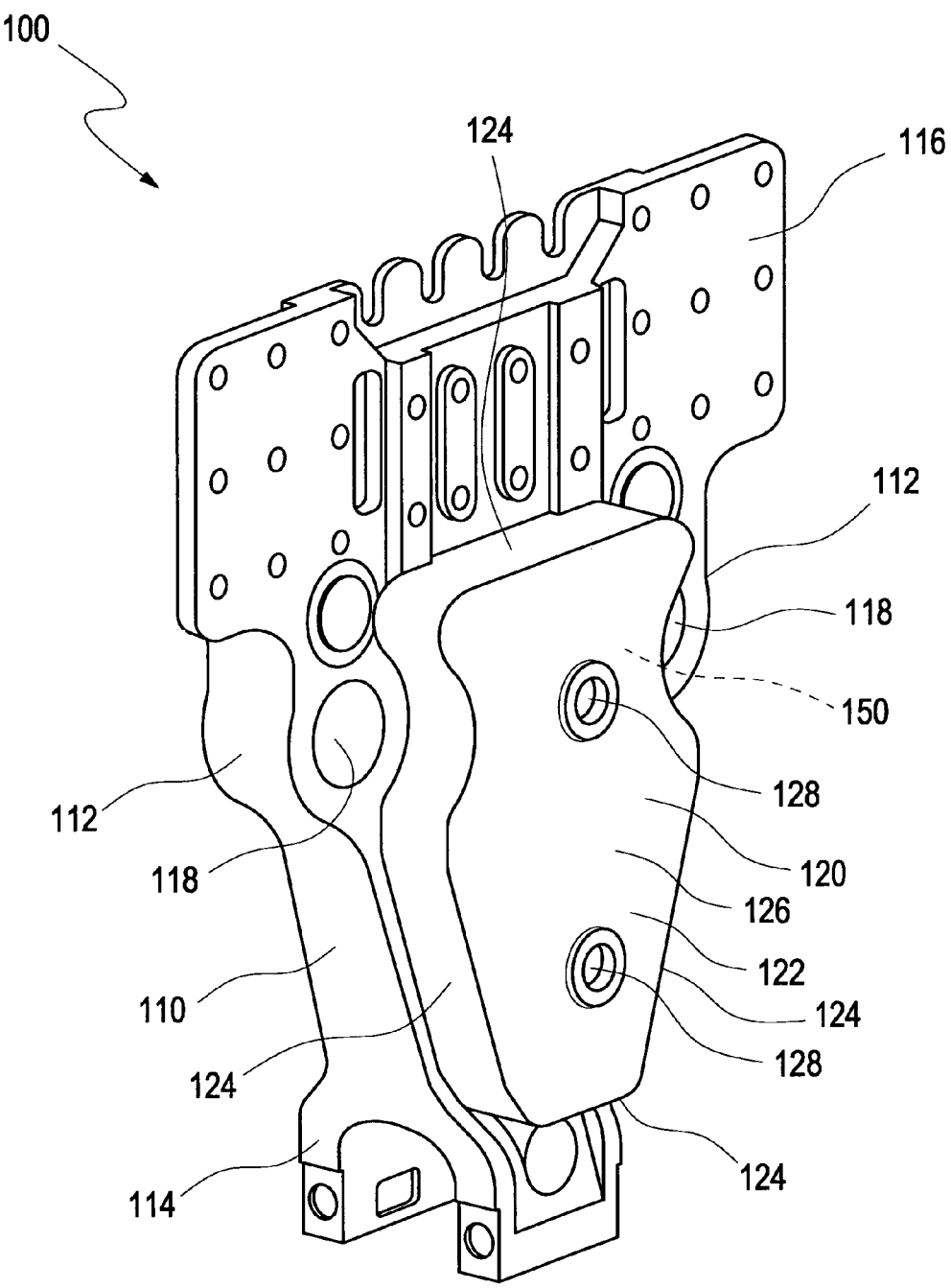
FIG. 2 a perspective view of a first example embodiment of a console comprising a casing of a tank.
Figure 3:
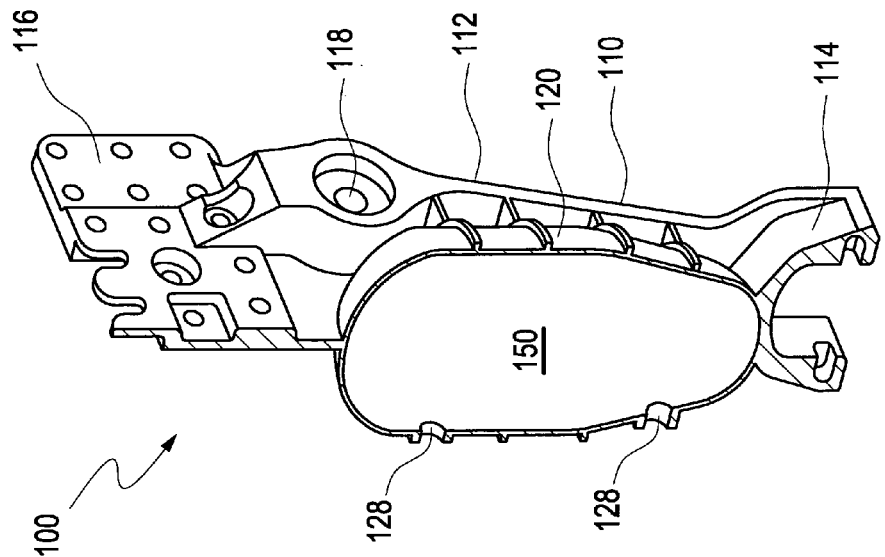
FIG. 3a, 3b a perspective view of another example embodiment of a console enclosing a casing of a tank (FIG. 3a) and a cut-open view of the tank (FIG. 3b)
Figure 3:
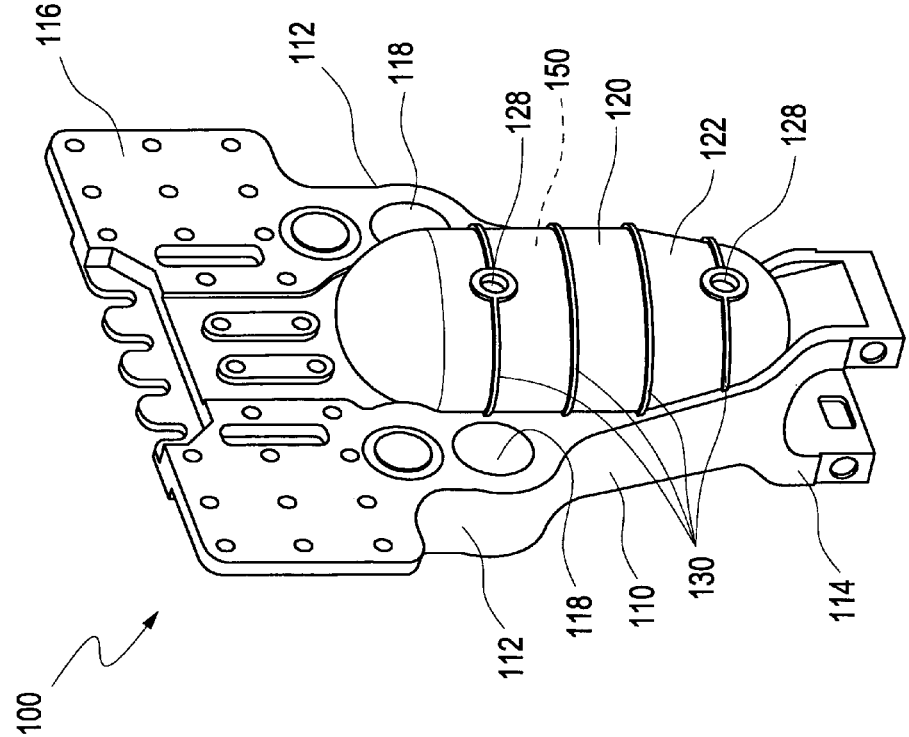

FIGS. 2 and 3a, 3b depict two designs of a console 100 with a bracket body 110. The bracket body 110 comprises a side wall 112, a bifurcated receptacle 114 for the reaction stays 18 (FIG. 1) at its lower end and a plate like holder 116 at its upper end which can be attached to the vehicle frame 10 (FIG. 1). The fastening rods 20 (FIG. 1) can be attached to the console 100 via openings 118.

The console 100 has in its middle part an integrated tank with a casing 120 for pressurized air so that the bracket body 110 forms the casing 120 of the tank enclosing a cavity 150. The casing 120 has a projecting outer surface 122.

Favourably, the wall thickness of the tank can be several millimeters thick, i.e. of about the same thickness as the middle part of the console 100 without the tank.

As a result, the mechanical strength and stability of the console 100 remains virtually unchanged. The side wall 112 of the console 100 is typically thicker for providing the attachment for the reaction stays 18 (FIG. 1).

The projecting outer surface 122 in FIG. 2 comprises a front surface 126 substantially parallel to the plate like holder 116 and thus parallel to the frame rail 24 (FIG. 1) and has side walls 124. Two borings 128 in the front surface 126 are used to remove a sand core which is used as a place holder during casting the bracket body 110. The borings 128 can be used to attach valves and pipes for connecting the tank to consumers for e.g. pressurized air stored in the cavity 150 of the tank.

The casing 120 can be embodied to project only on one side of the bracket body 110 or it can be arranged to project on both sides of the bracket body 110. The casing 120 in FIG. 3a, 3b exhibits an oval shaped projecting surface 122 which protrudes on both sides of the bracket body 110 as can be seen in FIG. 3b.

Stiffening corrugations 130 can be provided in the surface 122 of the casing 120 if required for better stability. The shape of the casing 120 can be chosen to available space in the vehicle, the required stability and the like. An appropriate shape of the casing 120 can be easily fabricated by casting the bracket body 110.

Figure 4:
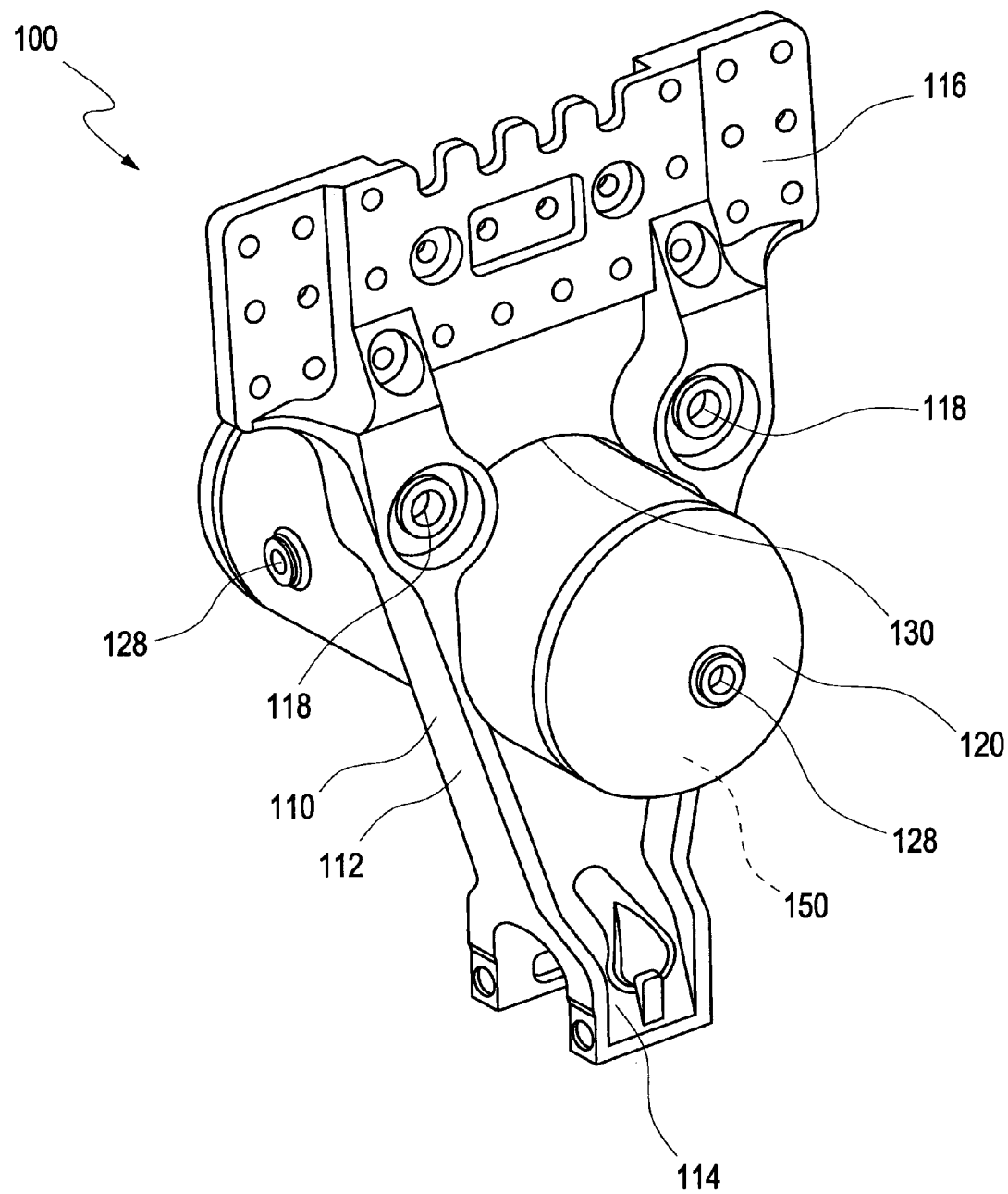
FIG. 4 a perspective front view of another example embodiment of a console with a receptacle for a casing of a tank and a separate tank attached to the console.

FIG. 4 depicts an alternative example embodiment of a console 100. The bracket body 110 comprises a central opening which is a receptacle 130 for a tank with a casing 120. By way of example, the tank can have the shape of a cylinder. Of course, the tank can have other shapes as desired.

The tank is plugged into the receptacle 130 and attached to the bracket body 110. The connection of the casing 120 of the tank onto or into the bracket body 110 can be performed by way of known techniques in the art as, for example, releasably with screws or permanently by welding and the like.

Figure 5:
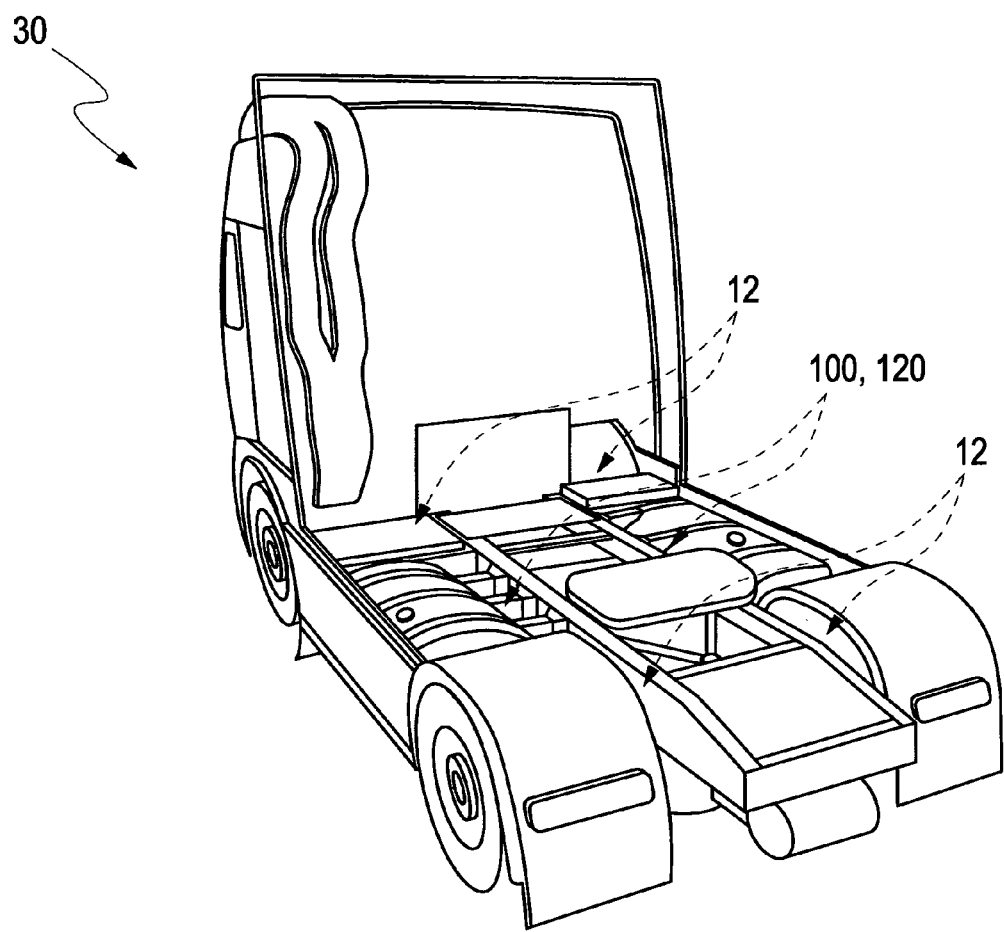
FIG. 5 an example embodiment of a vehicle comprising a console enclosing a cavity for storing a fluid.

FIG. 5 depicts a vehicle 30 which is equipped at both sides of its frame 10 with a console 100 enclosing the afbrementioned tank for storing a fluid in a cavity 150, particularly for storing pressurized air. The vehicle 30 is embodied as a tractor vehicle of a truck and comprises an air suspension 12 which is connected to the cavity 150 of the console 100 for supplying at least a part of the pressurized air in the air suspension 12. Of course, the pressurized air stored in the cavity 150 in the console 100 can be used in other consumers of pressurized air in the vehicle 30.

The invention claimed is:

1. A suspension carrying console for attachment to a vehicle chassis, wherein the console carries forces of the wheel holder over reaction stays or suspension elements into the chassis, comprising
    a bracket body for a truck, the bracket body being formed by a casting which at least partly forms a cavity in a middle region thereof for storing a fluid,
    wherein the bracket body is at least partially integrated in a casing surrounding the cavity, and the bracket body constitutes a casing,
    wherein the console with the casing is adapted to be, when in a mounted position, arranged between two wheel holders (14) on one side of the vehicle frame (10).

2. The console according to claim 1, wherein the casing has an elliptical shape.

3. The console according to claim 1, wherein the casing protrudes from one side of the bracket body.

4. The console according to claim 1, wherein the casing protrudes from both sides of the bracket body.

5. The console according to claim 1, wherein the volume of the cavity is larger than 5 liters.

6. The console according to claim 1, wherein the cavity is adapted to store pressurized air as fluid.

7. The console according to claim 1, wherein one or more attachment ducts are provided at the console for connecting as inlet and/or outlet for the fluid in the cavity.

8. A vehicle comprising a console according to claim 1.

9. The vehicle according to claim 8, wherein an air suspension is provided which is connected to a cavity of the console.

* * * * *